United States Patent [19]
Fichou et al.

[11] Patent Number: 6,118,791
[45] Date of Patent: *Sep. 12, 2000

[54] ADAPTIVE BANDWIDTH ALLOCATION METHOD FOR NON-RESERVED TRAFFIC IN A HIGH-SPEED DATA TRANSMISSION NETWORK, AND SYSTEM FOR IMPLEMENTING SAID METHOD

[75] Inventors: Aline Fichou, La Colle sur Loup; Pierre-Andre Foriel, St. Laurent du Var; Claude Galand, Cagnes/Mer, all of France

[73] Assignee: Cisco Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/760,202

[22] Filed: Dec. 4, 1996

[30] Foreign Application Priority Data

Dec. 20, 1995 [EP] European Pat. Off. ............... 95480182

[51] Int. Cl.[7] ........................... G01R 31/08; G06F 11/00; G08C 15/00
[52] U.S. Cl. .......................... 370/468; 370/230; 370/450; 370/462; 395/200.53
[58] Field of Search ..................... 370/468, 230, 370/450, 462, 455, 232, 234; 395/200.53

[56] References Cited

U.S. PATENT DOCUMENTS

| | | |
|---|---|---|
| 4,445,116 | 4/1984 | Grow .................................. 370/455 X |
| 4,538,147 | 8/1985 | Grow .................................. 370/455 X |
| 5,347,511 | 9/1994 | Gun .............................................. 370/54 |
| 5,359,593 | 10/1994 | Derby et al. ............................. 370/234 |
| 5,479,404 | 12/1995 | Francois et al. ......................... 370/468 |
| 5,548,579 | 8/1996 | Lebrun et al. ....................... 370/468 X |
| 5,715,394 | 2/1998 | Jabs ..................................... 395/200.53 |
| 5,815,492 | 9/1998 | Berthaud et al. ........................ 370/234 |
| 5,848,266 | 12/1998 | Scheurich ............................ 370/468 X |
| 5,881,050 | 3/1999 | Chevailer et al. ....................... 370/230 |
| 5,940,372 | 8/1999 | Bertin et al. ............................. 370/238 |

*Primary Examiner*—Huy D. Vu
*Assistant Examiner*—M. Phan
*Attorney, Agent, or Firm*—Ceasri and McKenna

[57] ABSTRACT

Adaptive bandwidth allocation for Non-Reserved traffic over high speed transmission links of a digital network is operated through regulation of data packet transfers over network nodes/ports including input/output adapters connected through a switching device. A network node is assigned with a Control Point computing devise (CP) storing a Topology Data Base containing an image of the network. This Data Base is periodically and at call set up updated by Topology Data Base Update messages (TDUs) including an Explicit Rate parameter for link l indicating the current available bandwidth on link l, and a parameter NNRl indicating the number of Non-Reserved connections on link l. This information are used within each Adapter to periodically regulate the transmission bandwidth assigned to each Non-Reserved traffic connection within the network. To that end, each adapter is provided with an Access Control Function device for each attached connection (data source) and a Connection Agent (CA) getting, on request, required current link informations from the attached Topology Data Base.

23 Claims, 5 Drawing Sheets

ADAPTIVE BANDWIDTH ALLOCATION METHOD FOR NON-RESERVED TRAFFIC IN A HIGH-SPEED DATA TRANSMISSION NETWORK, AND SYSTEM FOR IMPLEMENTING SAID METHOD

Field of the Invention

This invention relates to a method and system for adaptively and dynamically allocating operating bandwidth to Non-Reserved Bandwidth traffic in a high speed-data transmission network.

BACKGROUND OF THE INVENTION

Modern digital networks are made to operate in a multimedia environment for transporting different types of data (pure data or digitized information signals including voice, image, video, etc) over the same network, while ensuring the compliance with the requirements specific to each kind of traffic.

For instance, one may notice that the information provided by various users can be divided into different types. These include real-time information (such as voice information) that must be transmitted to the end-user within predefined limited time-delay restrictions, and non-real-time information. If some real-time information is not transferred within said time delay, it should simply be discarded.

In this case, recovery of the original signal, at an end-user location is made possible to some extent, by providing interpolation/extrapolation techniques, in a data packet transmission environment. These techniques do provide solutions to overcome the "loss" of only a limited number of discarded consecutive packets. They do not overcome the delay restriction requirement.

On one hand the information may be considered as including : a so-called Reserved traffic information whose transmission must be guaranteed with predefined maximum delay according to conditions contractually agreed upon by both parties, i.e. end-user and network owner ; and a Non-Reserved (NR) information, such as certain control information or traffic of specific sources to be vehiculated over the network with no specific time constraint, but which traffic should be optimized for network efficiency.

On the other hand, one should recall that different techniques have been developed, such as packet switching techniques, whereby the digitized data are arranged into so called bit packets as already mentioned, and circuit switching techniques.

The basic advantage of packet switching techniques as compared to circuit switching techniques, is to allow a statistical multiplexing of the different types of data over a line which optimizes the transmission bandwith. The drawback of packet switching techniques compared to circuit switching techniques, is that it introduces jitter and delay, which, as already considered, may be detrimental for the transmission of isochronous data, like video or voice. This is why methods have been proposed to control the network in such a way that delay and jitter are bounded for every new connection that is set-up across a packet switched network.

These methods have been described, for instance a co-pending European Application 94480097.8. All these methods include, for any end user requesting service or any control data to be transported over the network, establishing a path through network high speed links (or lines) and nodes or ports, with optimal use of the available transmission bandwidth.

Basically, one may allocate predefined bandwidth to Reserved traffic (including real-time) on the basis of contractually defined parameters, and then allocate whatever is left of the bandwidth to Non-Reserved traffic on a fixed basis.

But, bearing in mind that instantaneous traffic is eminently variable for both Reserved and Non-Reserved traffic, any fixed bandwidth assignment is naturally inefficient as far as the efficiency of global network utilization is concerned.

A first improvement consists in precomputed oversized bandwidth allocation on a source by source basis, with the provision of means for detecting instantaneous congestion occurring within the network and for monitoring some sort of "slowing-down" mechanism. Such a mechanism has already been described in the above mentioned copending European Application as well as in U.S. Pat. No. 5,280,470. In the mentioned co-pending application, the slowing-down mechanism is only used to control congestion at the node switching level through management of a switch backpressure signal. In the U.S. Pat. No. 5,280,470 slowing-down is operated over reserved bandwidths only when congestion is detected in network nodes and no increase is allowed, which may result in low link utilization in case of some sources being non-active. Accordingly, the data sources are not really taken into account on a dynamic basis. In other words, the considered prior art system does not provide true dynamic sharing among connections but only helps resolving traffic congestions temporarily by sending a slow-down message back to sources.

OBJECTS OF THE INVENTION

One object of this invention is to provide a method for optimizing bandwidth allocation to Non-Reserved traffic in a data communication network.

Another object of the invention is to provide a method for monitoring Reserved traffic and dynamically assigning or adapting transmission bandwidth to Non-Reserved traffic accordingly in a data communication network.

Still another object of the invention is to provide a method for dynamically and fairly distributing transmission bandwidth among Non-Reserved traffic source, based on real data sources requirements, in a communication network operating in Asynchronous Transfer Mode (ATM), or Frame relay.

These and other objects, characteristics and advantages of the invention, shall be more readily apparent from the following description of a preferred embodiment made with reference to the accompanying drawings.

SUMMARY OF THE INVENTION

This invention deals with an adaptive bandwidth allocation method for optimizing data traffic in a high speed data transmission network including Nodes interconnected by high speed links made for transporting data traffic of different priority levels along assigned network paths between data terminal equipment acting as data sources and data destination terminals, said priority levels including high priority level(s) for Reserved traffic for which a transmission bandwidth has been reserved along said assigned path based on predefined agreements, and low priority level for Non-Reserved traffic which should be transported over the network within the transmission bandwidth available along the considered path once Reserved traffic is satisfied, said method for assigning bandwidth to Non-Reserved traffic including:

generating and keeping at least one Topology Data Base storing an image of the network occupancy over each link along the network paths;

periodically and at any terminal call set-up within the network, generating and broadcasting Topology Data Base updating (TDUS) messages, said TDU messages including an Explicit Rate parameter (ERI) for each link l indicating the bandwidth currently available on link l, and a parameter NNR indicating the number of Non-Reserved connections on link l; and upon receving said TDU information, computing for each node along the considered path the amount of transmission bandwidth left available over each link along the considered path and assigning said available bandwidth to the Non-Reserved traffic sources connected to the network.

DETAILED DESCRIPTION OF A PREFERRED EMBODIMENT OF THE INVENTION

While the invention applies equally to both centralized control networks and distributed control networks, the preferred embodiment shall herein be described with reference to a distributed control data transmission network. Therefore, in no instances should this be considered as implying any limitation to the invention.

Figure 1:
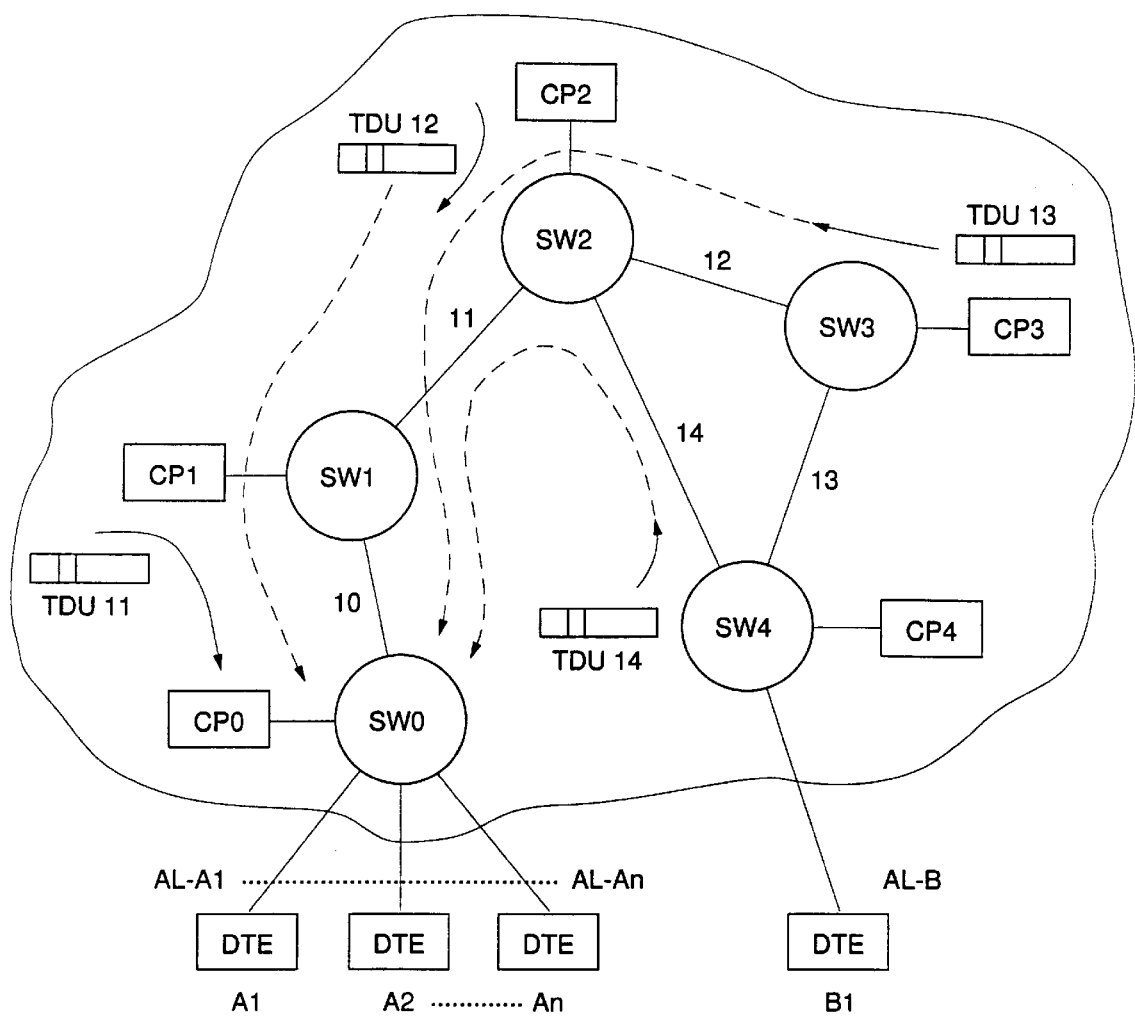
FIG. 1 is a schematic representation of an example of a data transmission network constructed according to the invention.

Accordingly, FIG. 1 shows an example of a packet switching network with distributed control, (i.e. control at each node of the network), which can be used to implement the invention. This network includes five switching nodes SW0 to SW4 interconnected by high speed trunk lines (or links) (10, 11, 12, 13 and 14). The nodes can be accessed by access lines (AL's) connected to outside data terminal equipments (DTE's) acting as data sources or destination terminals.

The network control architecture being a distributed one, each switching node is controlled by a control point CP. All CP's are interconnected via a control point spanning tree (CPST) which provides an efficient means for multicasting control messages between the control points. When a CP wants to broadcast a control message to other CP's in the network, it sends this message to the predefined CPST switching address, and the architecture provides the means to route this message on every line of the CP spanning tree, and only on these lines. This architecture also provides the means to initialize the tree address on each switching node, and to automatically reconfigure the tree in case of line or switching node failure.

Each CP includes a cop y of the Topology Data Base that contains the information about the network. It includes the network physical configuration and t he line characteristics and status.

For every line l in the network, transporting a Reserved traffic, the maximum delay T(n) that can be accepted for a packet with a specified priority, and the level of bandwidth utilization R_res(n) on this line are defined and recorded in the topology data base. This information is distributed to other control points via topology data base update messages (TDU$_s$) sent over the control point spanning tree whenever required.

For more informations on such a Spanning Tree organization, one may refer to the Copending European Patent Application number 94480048.1, with the title "A Data Communication Network and Method for Operating said Network".

In operation, any source user terminal equipment may request a connection to a destination terminal. For instance user terminal equipment DTE-A and DTE-B which are respectively connected to the network via access lines AL-A and AL-B, shall be interconnected thru the network with a given quality of service (QoS) specified in terms of a maximum delay T-max and a packet loss probability P-loss, upon DTE-A requesting being connected to DTE-B (i.e. at DTE-A call set-up).

To that end, at the switching node SW0, the control point CP0 first uses the QoS and the traffic characteristics specified by the user (peak rate, mean rate, average packet length) to compute the amount of bandwidth C_eq, called the equivalent capacity of the connection to be reserved on every line, on the route or path assigned to the traffic between source terminal and destination terminal, in order to guarantee a packet loss probability P0(n) on this line which is smaller than the loss probability P_loss that has been specified for the connection.

Based on the information that is available on a per-line basis in the topology data base, the control point CP0 then computes the best route in the network to reach the destination. To that end, a Path Selection Program first identifies the network lines that are eligible for the route. If R(n) and R_res(n) respectively denote the capacity of line n and its current level of reservation, then the line is eligible if:

$$R\_res(n)+C\_eq \leq 0.85\ R(n)$$

it then uses a modified Bellman-Ford algorithm to find the minimum weight, minimum hop count, route from the origin to the destination which uses eligible lines and which satisfies the QoS.

$$T\_max \leq \Sigma T(n)$$

$$P\_loss \leq 1-\pi(1-P\_1(n))$$

where the summation and product operators are carried over the N lines of the route (n=1, . . . , N).

For additional information on equivalent capacity and best route considerations, one may refer to the following publications:

R. Guerin, H. Ahmadi, M. Naghshineh, "Equivalent Capacity and its Application to Bandwidth Allocation in High Speed Networks", published in IEEE Journal of Selected Areas in Communications, JSAC-7, September 1991.

H. Ahmadi, J. S. Chen, R. Guérin, L. Gün, A. M. Lee and T. Tedijanto, "Dynamic Routing and Call Control in High-Speed Integrated Network", pusblished in Proc. Workshop Sys. Eng. Traf. Eng., ITC 13, pp 397–403, Copenhagen, Denmark.

Now, let's assume that the chosen route to connect DTE-A1 to DTE-B from switching node SW0 to switching node SW4 uses trunk lines 10, 11 and 14 via switching nodes SW1 and SW2 and access lines AL1 on switching nodes SW0 and SW4.

To that end, the origin control point CP0 sends a connection set-up message along the route, a copy of which is delivered to the control point of every switch on the route (e.g. CP1, CP2 and CP4). This message contains a list of the network addresses of the control points on the route, the list of the link names (e.g. 10, 11, 14) between these control points, the requested bandwidth C_eq, the priority of the connection, and a connection correlator C_cor which is set by the origin control point CP0 and which is used by all other CP's to uniquely identify the connection.

Upon reception of the copy of the set-up message, each CP performs two basic tasks.

First, the CP checks whether the equivalent capacity of the new connection is still available on the line to the next switching node on the route, and if it is available, it reserves it. Therefore, the CP checks whether the line is eligible by verifying the first above relation. If it is, the CP reserves the desired amount of bandwidth on the transmit line for the new connection, accepts the connection set-up, increments the reservation level:

$$R\_res(n)=R\_res(n)+C\_eq$$

and if this reservation level has significantly changed, it eventually broadcasts a topology data update (TDU) message on the CP spanning tree to inform the other CP's of the new reservation level R_res of this particular line.

Second, the CP allocates a new label for the new connection, and sends back this label to the control point of the previous switch on the route, for label swapping purposes.

Accordingly, during network operation, each node n (n=0, 1, . . . ) Control Point (CPn) periodically, and at call set-ups, broadcasts Topology Data-Bases Updating (TDUs) messages collected by access nodes. Now, for the purpose of the dynamically adaptive control of the network bandwidth allocation of this invention, the TDU format includes an Explicit Rate (ER) parameter. Accordingly, as represented in FIG. 1, the TDU format for any link l includes, in the above mentioned TDU messages, the Explicit Rate for link l (i.e. ERl) which ERl shall specify the current available bandwidth on the link l divided by the number of NR connections, and therefore indicate dynamically said available bandwidth to the corresponding Control Points. This information enables adaptively assigning bandwidth to sources requesting service for transmitting Non-Reserved (NR) traffic, with a full knowledge of the bandwidth currently available on all considered links.

Assuming the traffic to be transported from source terminal DTE-Al to destination terminal DTE-B, through the above mentioned path SW0, 10, SW1, 11, SW2, 14, SW4, then each of these node Topology Data Bases shall have available the Explicit Rates on the node connected trunks.

In addition, the TDU format over link l shall also include an indication of number of Non-Reserved connections on said link l, (i.e. : $N_{NRl}$).

Given this information, not only the access node (SWO) Control Point is made capable of defining whether Non-Reserved traffic from DTE_A may be sent over the network, but in addition the network organization makes it possible to fairly and dynamically adjust the bandwidth distributed among the link connected Non-Reserved sources in order to minimize data packet loss, without impacting Reserved traffic.

Figure 2:
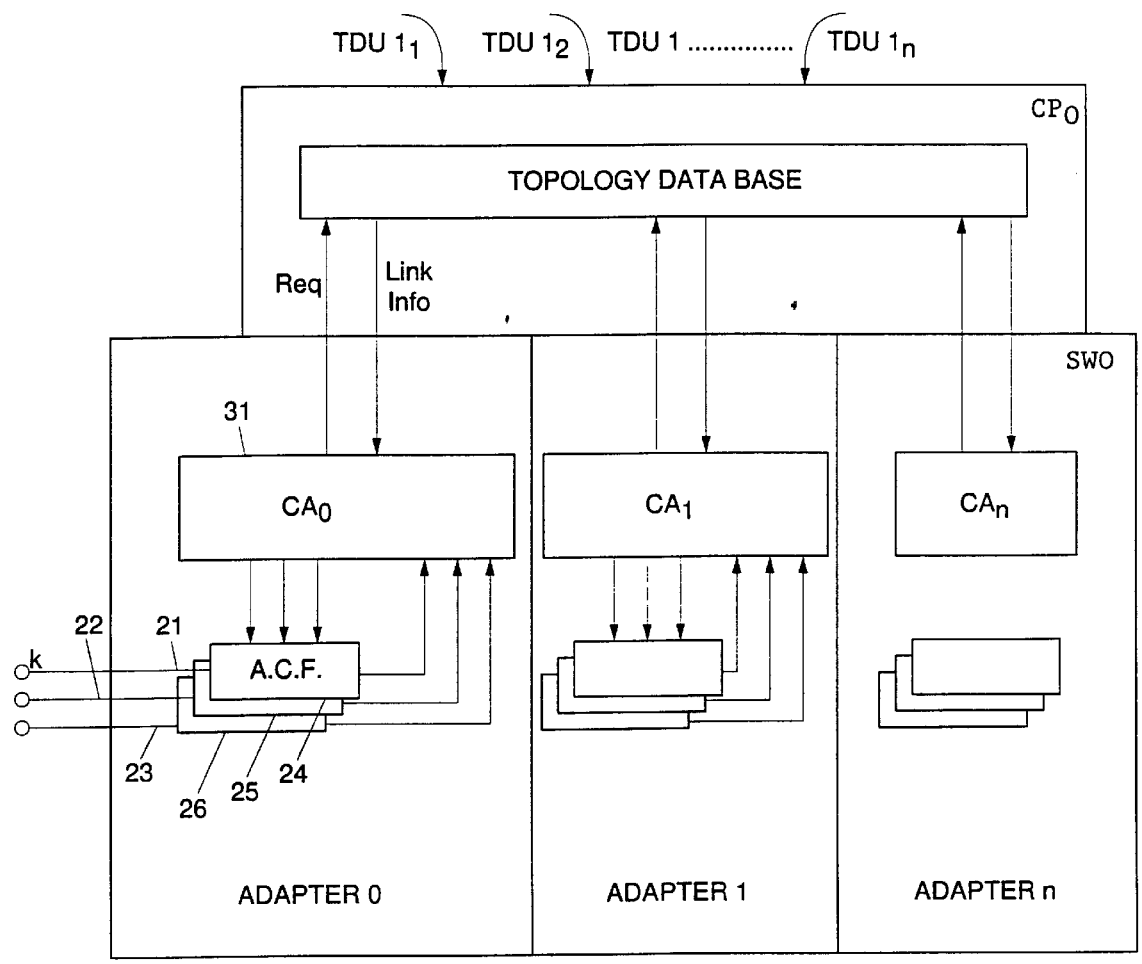
FIG. 2 is a schematic representation of a device for implementing the invention within one network node.

Represented in FIG. 2 is a block diagram showing the various devices used within any given node, e.g. a zero including a switching device SW0 and attached Control point device CP0. The switching device SW0 includes several adapters each being connected to one line or link. The adapters are labelled Adapter 0, Adapter 1, . . . , Adapter n. One line may handle up to thousands of connections to traffic sources. For example, traffic sources labelled 21, 22, 23 are represented attached to Adapter 0.

The data traffic of each data traffic source 21, 22, and 23 is directed to a corresponding traffic source access control unit 24, 25, and 26 respectively. The traffic access control units 24, 25, and 26 individually send information to and receive information from a connection agent (CA) 31. Each connection agent; (CAo, CAl, . . . CAn) is attached to the node Control Point (CP0) to get, on request, link information for local connections attached, from the corresponding Topology Data Base. Also, as already mentioned, the CPO Topology Data Base gets the Topology Data Update (TDU) messages (e.g. TDU 11, TDU 12 . . . ) f rom the network links (see FIG. 1).

Figure 3:
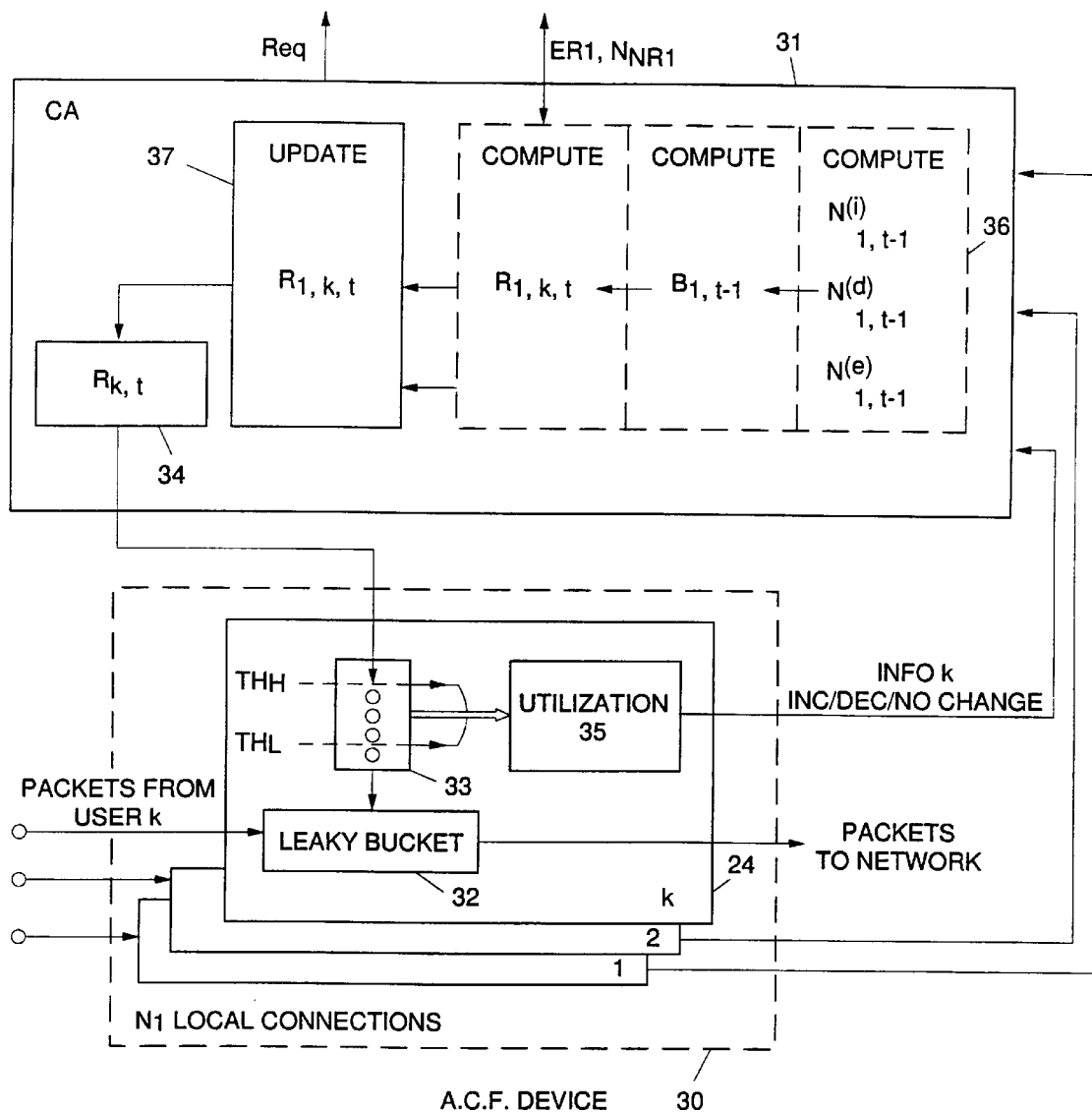
FIG. 3 is a detailed representation of the system illustrating an implementing of the invention within one node adapter.
Figure 4:
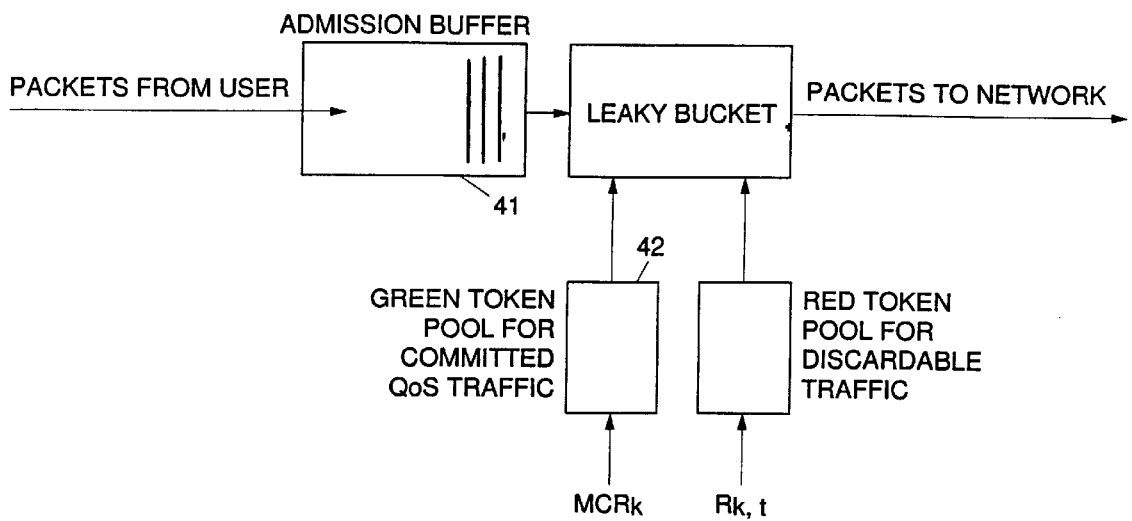
FIG. 4 is a schematic representation of a device to be used within the invention.

Represented in FIG. 3 is an illustration of the operation of an Access Control Function (ACF) device 30 and the Connection agent 31. To understand the operation of this system, one should first remember that the data traffic from any user is organized into packets (or ATM cells herein considered as packets) the transmission of which, over a node output line, is regulated. Various regulating methods are known in the art. One of these methods utilizes a so-called Leaky Bucket mechanism. A leaky bucket mechanism is illustrated in FIG. 4. The incoming data packets to be transferred are first passed through an admission buffer or shift register arrangement 41. The transfer from admission buffer 41 to the network line is regulated by a token pool. To that end, a "token" generator is made to generate tokens at a predefined rate and said tokens are stored into a token pool 42. Then, each data packet to be transferred from the admission buffer 41, to the network, shall request as many tokens as the data packet contains bytes. Should these tokens be available in the token pool 42, the data packet is passed to the network. Otherwise the data packet waits until the number of tokens has been generated. Since the tokens are individually attached to the requesting data packets, the mechanism may be improved to enable discrimination between discardable and non discardable data. Therefore, at the leaky bucket level, processing discrimination between discardable packets and non-discardable packets can be performed through duplication of the token pool. To illustrate this, non-discardable packets can be tagged with a green tag and discardable packets can be tagged with a red tag. Accordingly two token pools are then used, one for "green" tokens and one for "red" tokens. Both pools are filled independently from each other. The green token pool is filled at a token rate C_eq(k) equal to the equivalent capacity that has been reserved for the connection k in the network, or at a token rate $MCR_k$ which is the minimum guaranteed bandwidth for NR. The red token pool is filled at a token rate $R_{k,t}$. While the computation of C_eq is described in the above mentioned references, the adaptive computation of the $R_{k,t}$ is an object of the present invention.

Discardable data packets may include voice data packets recoverable at receiving end through several known mechanisms, e.g. interpolation/extrapolation mechanisms. But what is more important for the present invention is that the data packet transfer through the leaky bucket mechanism may be regulated by controlling the token generation rates. This is why, turning back to FIG. 3, one may notice that the Leaky Bucket 32 of the traffic source access control unit (24) for a data source k is attached to a variable rate token pool 33. This token pool 33 is also provided with threshold reference indications (a low threshold reference $TH_L$ and a high threshold reference $TH_H$) to be used for regulation purposes. The token pool level with respect to these thresholds indicates the measure of utilization and defines whether the token generation rate should be increased, decreased or kept even (i.e. not changed).

For every connection along the path under considered the token generation rate $R_{k,t}$ is updated by a mechanism. For instance, a token rate computing device 36 for connection k, updates the token generation at time t by providing an updated token generation rate $R_{k,t}$. This is made possible first through the use of a parameter measuring the utilization on connection k (obtained via token utilization device 35) monitored by the token pool 33 and indicating whether the token generation rate should be increased, decreased or not changed, for instance, based on monitoring the token pool level with reference to $TH_H$ and $TH_L$.

The information provided by all the token utilization devices, such as 35, attached to the individual local connections of the Access Control Function device 30 attached to the considered access link, are fed into an allocated bandwidth computing device 36 within the Connection Agent device 31. This computing device 36 keeps tracking the bandwidth currently allocated to each connection k of the considered port. The computing device 36, in turn, drives a rate updating device 37 controlling the token rate device 34. The computing device 36, is provided, upon request, with all required Explicit Rates ($ER_l$) and numbers of Non-Reserved connections ($N_{NRl}$) available in the Topology Data Base as updated by the various $TDU_S$) fed into the considered node Control Point (e.g. CP0) to enable computing the updated token generation rate $R_{l,k,t}$ to be assigned to the connection k on link l at time t, and then drive the token rate device 34.

In operation, the system gets periodically leaky bucket measures and is able to decide if a connection needs its rate to be increased (i) decreased (d), or kept even (i.e. unchanged) (e).

Let $L_k$ be the set of links along the path of connection k. To determine the rate allowed to the connection k of the local port (e.g. SWO for DT_A) one first needs to know the portion $B_{l,t}$ of the bandwidth allocated to all the connections of the port, for every link l belonging to $L_k$ along their path. $B_{l,t}$ is given by:

$$B_{l,t} = ER_l \times N_l$$

$$= \frac{(1 - (Rho)_{l,t}^{res})Cl - \sum_{k=1}^{N_{NRl}} MCR_k}{N_{NRl}} N_l$$

wherein $N_l$ is the number of Non-Reserved connections attached to the local port that have link l in their path $ER_l$ is the explicit rate for link l;

$(Rho)^{res}_{l,t}$ is the bandwidth ratio used by reserved traffic on link l at time t, statistically monitored on the network nodes considered.

$C_l$ is the link l speed $N_{NRl}$ is the total number of Non-Reserved connections within the network that have link l on their path.

$MCR_k$ is the fraction of bandwidth "reserved" for Non Reserved traffic of connection k. (even though this parameter $MCR_k$ should be null for Non-Reserved traffic, one may optionally reserve a fair minimum bandwidth anyway, for that traffic). In other words $$\sum_{k=1}^{N_{NR}} MCR_k$$

would be the sum of the Minimum Cell Rates (MCR) (if any) of all Non-Reserved connections sharing link l.

Then, using the leaky bucket measurements for the local node at time t-1, the new explicit rates $R_{k,t}$ for sources attached to this node should be computed for time t.

Using information from the leaky bucket, the system can deduce the number $N^{(i)}_{l,t}$ of connections bottlenecked asking for more bandwidth, $N^{(d)}_{l,t}$ from connections which do not use all their bandwidth and therefore can release some of it, $N^{(e)}_{l,t}$ of connections which use the bandwidth they need and do not need more ($N_l = N^{(i)}_{l,t} + N^{(d)}_{l,t} + N^{(e)}_{l,t}$). Note that this classification based on whether the rate of connection k should be increased, decreased or unchanged only depends on the current value set at the local node, $R_{k,t-1}$.

For a given connection k, we will use the current rate $R_{l,k,t-1}$ set on link l at time t-1 and re-write $R_{l,k,t-1}$ as $R^{(d)}_{l,k,t-1}$ if connection k needs a decrease, $R^{(i)}_{l,k,t-1}$ if connection k needs an increase and R(e)l,k,t-1 if connection k can be held to its current rate. The computation of the rates $R_{l,k,t}$ is done according to the following recurrent system on every link l of Lk:

$\emptyset$ if decrease, $$R_{l,k,t} = \frac{B_{l,t}}{B_{l,t-1}} \left[ R^{(d)}_{l,k,t-1} \cdot \alpha'_{l,t} \right]$$

$\emptyset$ if no change, $$R_{l,k,t} = \frac{B_{l,t}}{B_{l,t-1}} \left[ R^{(e)}_{l,k,t-1} \cdot \alpha^n_{l,t} + \beta'_{l,t} \right]$$

$\emptyset$ if increase, $$R_{l,k,t} = \frac{B_{l,t}}{B_{l,t-1}} \left[ \frac{1}{N^{(i)}_{l,t}} \sum_{j=1}^{N^{(i)}_{l,t}} R^{(i)}_{l,j,t-1} + \beta''_{l,t} \right]$$

where $\alpha'_{l,t}$ and $\alpha''_{l,t}$ are multiplicative decrease factors and $\beta'_{l,t}$ and $\beta''_{l,t}$ are additive increase factors.

The rate of connection k is then set to the minimum rate computed along its path:

$$R_{k,t} = \min_{l \in L_k} \{R_{l,k,t}\}$$

and then, $$R_{k,t} = \max \{MCR_k, \min \{PCR_k, R_{k,t}\}\}$$

The underlying assumption for this model is that all connections should be able to release at any time the bandwidth they got in order to satisfy a defined fairness criterion. For instance, if at an arbitrary time there are only connections which ask for an increase and connections which are "ok", it is not fair that this state for the previous system be stable some of the bandwidth allocated to the connections "ok" should be re-distributed among the bottlenecked connections. The fairness criterion chosen here means that a state where all connections need more bandwidth than the network can offer is a more fair state than the unbalanced state mentioned here above. This is, naturally, but one of the fairness criterion which could be used.

The sum term in the equation for connections which need more bandwidth is also used to achieve some fairness among them. Without this term (i.e., simply using $R^{(i)}_{l,k,t-1}$), connections which already have a significant amount of the total bandwidth and ask for more will never release part of what they got in favor of connections with small rates which suddenly ask for bandwidth. As this scenario is not fair, the global bandwidth of connections waiting for an increase should be equally redistributed (according to the max-min criterion).

At last, the term $B_{l,t}/B_{l,t-1}$ equally distributes over all connections the variations of the available bandwidth for non reserved traffic on link l.

The problem for computing $\alpha'_{l,t}, \alpha''_{l,t}, \beta'_{l,t}$ and $\beta''_{l,t}$ is not simple, as they are function of one or more of the time variables $N^{(i)}_{l,t}, N^{(d)}_{l,t}, N^{(e)}_{l,t}$. As a consequence, they are themselves functions of time. Moreover, these parameters should always satisfy, for link l, that $$\sum_{j=1}^{N_l} R_{l,j,t} = B_{l,t}/B_{l,t-1} \times \sum_{j=1}^{N_l} R_{l,j,t-1}$$

The resolution of the system being too complex to be evaluated for each time t, an heuristic approach should be employed:

For connections which should decrease, $\alpha'_{l,t}$ is less than one and should be closer to 0 as the number of connections which need bandwidth is high. Some of the bandwidth released should also be added to connections which need no change, i.e., is part of the $\beta'_{l,t}$ term. We set:

$$\alpha'_{l,t} = 1 - \frac{N^{(i)2}_{l,t}}{N_l^2} - \frac{N^{(i)}_{l,t} N^{(e)}_{l,t}}{N_l^2} \quad (1)$$

For connections which should need equal bandwidth, $\beta'_{l,t}$ should also be closer to 0 as the number of connections which need bandwidth is high.

$$\alpha''_{l,t} = 1 - \frac{N^{(i)2}_{l,t}}{N_l^2} \quad (2)$$

On the other hand, the rate of these connections grows up by applying $N^{(i)}_{l,t} N^{(e)}_{l,t}/N_l^2$ on connections which release bandwidth.

This amount is equally distributed over the $N^{(e)}_{l,t}$ connections;
this gives:

$$\beta'_{l,t} = \frac{N^{(i)}_{l,t}}{N_l^2} \sum_{j=1}^{N^{(d)}_{l,t}} R^{(d)}_{l,j,t-1} \quad (3)$$

For connections which should increase, the term $\beta''_{l,t}$ is the total bandwidth released by applying the term $N^{(i)2}_{l,t}/N_l^2$ on both previous sets of connection rates, equally distributed over the $N^{(i)}_{l,t}$ connections:

$$\beta''_{l,t} = \frac{N^{(i)}_{l,t}}{N_l^2} \left( \sum_{j=1}^{N^{(d)}_{l,t}} R^{(d)}_{l,t-1} + \sum_{j=1}^{N^{(e)}_{l,t}} R^{(e)}_{l,j,t-1} \right) \quad (4)$$

The algorithm used to implement the invention may be summarized as follows :

For all connections:

using the leaky bucket statistics, "mark" connection k as requiring an increase, decrease, or no change.

For all links:

Compute $N^{(i)}_{l,t}, N^{(d)}_{l,t}$ and $N^{(e)}_{l,t}$

Upon reception of a TDU message, update the available bandwidth available on each link l:

$$B_{l,t} = ER_l \times N_l = \frac{(1-(Rho)^{res}_{l,t})C_l - \sum_{k=1}^{N_{NRl}} MCR_k}{N_{NRl}} N_l \quad (5)$$

∅ Compute $\sum_{j=1}^{N^{(d)}_{l,t}} R^{(d)}_{l,j,t-1}, \sum_{j=1}^{N^{(i)}_{l,t}} R^{(i)}_{l,j,t-1}$ and $$\sum_{j=1}^{N^{(e)}_{l,t}} R^{(e)}_{l,j,t-1}$$

For all connections:

For all links in connection path, update $R_{l,k,t}$:

-if decrease, (6)

$$R_{l,k,t} = \frac{B_{l,t}}{B_{l,t-1}} \left[ R^{(d)}_{l,k,t-1} \left( 1 - \frac{N^{(i)2}_{l,t}}{N_l^2} - \frac{N^{(i)}_{l,t} N^{(e)}_{l,t}}{N_l^2} \right) \right]$$

-if no change, (7)

$$R_{l,k,t} = \frac{B_{l,t}}{B_{l,t-1}} \left[ R^{(e)}_{l,k,t-1} \left( 1 - \frac{N^{(i)2}_{l,t}}{N_l^2} \right) + \frac{N^{(i)}_{l,t}}{N_l^2} \times \sum_{j=1}^{N^{(d)}_{l,t}} R^{(d)}_{l,j,t-1} \right]$$

-if increase, (8)

$R_{l,k,t} =$ $$\frac{B_{l,t}}{B_{l,t-1}} \left[ \frac{1}{N^{(i)}_{l,t}} \sum_{j=1}^{N^{(i)}_{l,t}} R^{(i)}_{l,j,t-1} + \frac{N^{(i)}_{l,t}}{N_l^2} \left( \sum_{j=1}^{N^{(d)}_{l,t}} R^{(d)}_{l,j,t-1} + \sum_{j=1}^{N^{(e)}_{l,t}} R^{(e)}_{l,j,t-1} \right) \right]$$

∅ and set (9)

$$R_{k,t} = \min_{l \in L_k} \{R_{l,k,t}\}$$

$$R_{k,t} = \max\{MCR_k, \min\{PCR_k, R_{k,t}\}\} \quad (10)$$

In practice, it is expected that the non-reserved traffic will be mostly bursty with long idle periods. Because of these silent phases, it is reasonable to think that only a few connections will be active and then performances would be increased by introducing some statistical multiplexing. Basically, this means that we could allocate to every connection a "little bit more" than its rough fair share, as long as there is no congestion within the network.

Figure 5:
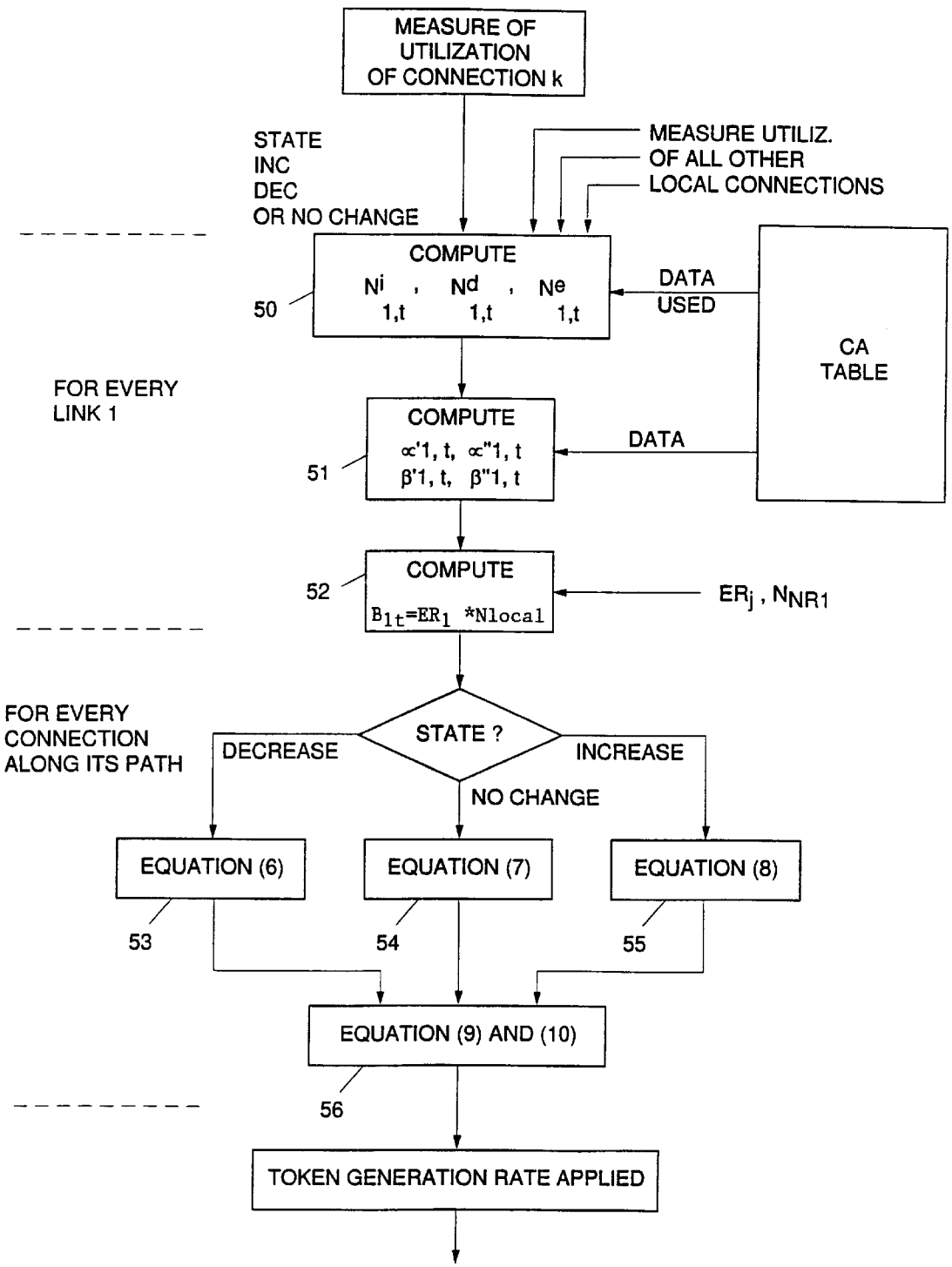
FIG. 5 is a detailed flow-chart illustrating an implementation of the invention.

Represented in FIG. 5 is a block diagram of the algorithm for implementing the invention and getting the rate adjustment looked for, for a connection k.

First, a measure of utilization as defined by token utilization device 35 (see FIG. 3), as well as the measures of utilization of all other local connections (1, 2, 3, . . . k−1) is provided to a computing stage 50. Said computing stage also gets the rates at t−1 from a TABLE stored in the Connection Agent (CA) considered. Said table looks as follows:

TABLE

|  | link 1 | link 2 | — | link 1 |
|---|---|---|---|---|
| Connection 1 | $R_{1,1,t-1}$ | — | — | $R_{1,1,t-1}$ |
| Connection 2 | — | — | — | — |
| — | — | — | — | — |
| Connection k | — | — | — | $R_{1,k,t-1}$ |

The computing stage 50 (see FIG. 5) provides then $N^{(i)}_{l,t}$, $N^{(d)}_{l,t}$ and $N^{(e)}_{l,t}$.

This information, together with the data provided in the above TABLE are then passed through a second computing stage 51, wherein the parameters $\alpha'_{l,t}$, $\alpha''_{l,t}$, $\beta'_{l,t}$ and $\beta''_{l,t}$ are computed according to the above mentioned equations 1 through 4, respectively.

Finally, the $\alpha$ and $\beta$ parameters, are fed into a third computing stage 52, together with the Explicit Rates for link 1 and the number of Non-Reserved traffics $N_{NRl}$, to enable computing the updated available bandwidth $B_{l,t}$ according to equation 5.

The above computing operations of stages 50, 51 and 52 are performed for every link l.

Then, for every connection along the considered path, and depending whether the state of the connection as defined by the measure of utilization is: decrease, no change, (i.e. keep even), or increase, then the link rate is updated according to equations 6, 7 or 8 respectively, as indicated in stages 53, 54 and 55 of FIG. 5 (and device 37 in FIG. 3).

Finally, the new token rate for link k (see device 34 in FIG. 3), is computed in stage 56 through computation of equations (9) and (10). This new token generation rate $R_{k,t}$ is then applied to update the token generation rate for the token pool 33 (see FIG. 3).

What is claimed is:

1. An adaptive bandwidth allocation method for optimizing data traffic in a high speed data transmission network, including switching nodes interconnected by one or more high speed links, for transporting data traffic of different priority levels along network paths between data sources and data destinations, said priority levels including a high priority level for reserved data traffic for which transmission bandwidth is reserved along a selected path and a low priority level for non-reserved data traffic which may be transferred over the network on individual links on the selected path using transmission bandwidth which remains available along the selected path after reserved data traffic requirements are satisfied, said method comprising the steps of:

generating at least one topology database image of the network occupancy over each link along the network paths;

at least in response to a terminal call set-up within the network, generating and broadcasting topology database updating (TDU) messages by at least one switching node and storing said TDU messages in said at least one topology database image, said TDU messages including, for each link l, an Explicit Rate parameter ($ER_l$) indicating the bandwidth currently available on link l, and a parameter $N_{NR}$ indicating the current number of non-reserved connections on link l; and receiving TDU information from other switching nodes along the selected path and computing the amount of transmission bandwidth remaining available on each link along the selected path and making said remaining bandwidth available to non-reserved data traffic sources connected to the network by an access control function device in said at least one switching node.

2. A method according to claim 1 wherein the transmission network comprises a distributed control network, a topology database is stored in each switching node, and said TDU messages are broadcast to switching nodes along the selected path, said method being implemented in a plurality of switching nodes on the selected path.

3. A system for adaptively allocating transmission bandwidth in a high speed transmission network including switching nodes attached to at least one control point processing unit which maintains at least one updated topology database representing an instantaneous image of the network, the switching nodes being interconnected by high speed links for transporting data traffic of different priority levels between data traffic sources and destination terminals, the priority levels including a high priority level for reserved data traffic for which transmission bandwidth is reserved in each link along the path and a low priority level for non-reserved data traffic which may be transported over the network using transmission bandwidth remaining available along the path once reserved data traffic requirements have been satisfied, said system comprising:

a traffic source access control unit connected to each data traffic source k attached to a link l for monitoring the source traffic and measuring concurrent utilization of link l by the data traffic source k;

a connection agent device connected to each said access control element of a data traffic source attached to said link l;

a first computing device within said connection agent device for computing the portion of line bandwidth $B_{l,(t-1)}$ currently allocated to each connection k on said link l;

a second computing device for computing an updated rate $R_{k,t}$ assignable to each non-reserved traffic source of each said connection k attached to link l, through said traffic source access control unit; and a data packet transmission regulator responsive to said updated rate $R_{k,t}$ for adaptively regulating the transmission of lower-priority data packets over said $k^{th}$ connection.

4. The system of claim 3 wherein each switching node is assigned a control point device for storing the topology database, said system comprising means for broadcasting topology database updating messages (TDU) including, for a link l, an Explicit Rate parameter $ER_l$ indicating the currently available bandwidth on said link l and a parameter $N_{NR}$ indicating the number of non-reserved connections currently established on said link l.

5. The system of claim 3 wherein said traffic source access control unit comprises:

a leaky bucket comprising a token pool connected to each data traffic source connection k for receiving data packets therefrom to be passed to the next link on the selected path upon collecting a token from said token pool which is filled at a token generation rate $R_{k,t}$; and, a utilization device for periodically monitoring the content of said token pool with respect to predefined threshold levels, and for measuring the connection k requirements based on the fill level of said token pool with respect to said threshold levels.

6. The system of claim 5 comprising a second token pool to enable distinguishing between reserved data traffic and non-reserved data traffic.

7. The system of claim 5 wherein said utilization device monitors the token pool fill level corresponding to the data traffic source k with respect to a low threshold ($TH_l$) ($TH_L$) value and a high threshold value ($TH_H$) and generates an indication for controlling said token generation rate.

8. An adaptive bandwidth allocation method for optimizing data traffic in a switching network having a plurality of switching nodes and a control system, the switching nodes interconnected by a plurality of communication links, each communication link for transporting data packets from a plurality of data traffic sources over a plurality of connections, the data packets including data packets of a higher priority and data packets of a lower priority, the control system including a topology database containing connection information about the network, said method comprising the steps of:

monitoring the bandwidth utilization $B_{l,(t-1)}$ of the lower-priority data packet transmittals sent by the plurality of data traffic sources and transported on a selected communication link l;

deducing the number $$N_{l,t}^{(i)}$$

of connections requiring an increase in bandwidth allocation;

deducing the number $$N_{l,t}^{(e)}$$

of connections not requiring a change in bandwidth allocation;

deducing the number $$N_{l,t}^{(d)}$$

of connections which can accommodate a decrease in bandwidth allocation;

computing an updated bandwidth allocation value $$B_{l,t}(N_{l,t}^{(i)}, N_{l,t}^{(e)}, N_{l,t}^{(d)})$$

as a function of said numbers $$N_{l,t}^{(i)}, N_{l,t}^{(e)}, \text{and } N_{l,t}^{(d)};$$

and adaptively regulating the transmission of the lower-priority data packets sent over a $k_h$ connection into the network in accordance with an updated rate $$R_{k,t}(N_{l,t}^{(i)}, N_{l,t}^{(e)}, N_{l,t}^{(d)}).$$

9. The method of claim 8 wherein said step of monitoring the bandwidth utilization is performed in conjunction with a leaky bucket mechanism.

10. The method of claim 8 further comprising the step of accessing data from the topology database.

11. The method of claim 8 further comprising the step of sending said updated bandwidth allocation value $$B_{l,t}(N_{l,t}^{(i)}, N_{l,t}^{(e)}, N_{l,t}^{(d)})$$

value to the topology database.

12. The method of claim 8 further comprising the step of adaptively regulating the transmission of the lower-priority data packets sent over a $j^{th}$ connection into the network in accordance with an updated rate $$R_{j,t}(N_{l,t}^{(i)}, N_{l,t}^{(e)}, N_{l,t}^{(d)}).$$

13. The method of claim 8 further comprising the steps of:

monitoring the bandwidth utilization $B_{m(t-1)}$ of the lower-priority data packet transmittals sent by the plurality of data traffic sources and transported on a selected communication link m;

deducing the number $$N_{m,t}^{(i)}$$

of connections requiring an increase in bandwidth allocation;

deducing the number $$N_{m,t}^{(e)}$$

connections not requiring a change in bandwidth allocation;

deducing the number $$N_{m,t}^{(d)}$$

of connections which can accommodate a decrease in bandwidth allocation;

computing an updated bandwidth allocation value $$B_{m,t}(N_{m,t}^{(i)}, N_{m,t}^{(e)}, N_{m,t}^{(d)})$$

as a function of said numbers $$N_{m,t}^{(i)}, N_{m,t}^{(e)}, \text{and } N_{m,t}^{(d)};$$

and adaptively regulating the transmission of the lower-priority data packets sent over an $i_{th}$ connection into the network in accordance with an updated rate $$R_{i,t}(N_{m,t}^{(i)}, N_{m,t}^{(e)}, N_{m,t}^{(d)}).$$

14. An adaptive bandwidth allocation device suitable for use in a switching network having a plurality of switching nodes and a control system, the switching nodes interconnected by a plurality of communication links, each communication link for transporting data packets from a plurality of data traffic sources over a plurality of connections, the data packets including data packets of a higher priority and data packets of a lower priority, the control system including a topology database containing connection information about the network, said adaptive bandwidth allocation device comprising:

a plurality of adapters resident in at least one of the switching nodes, each said adapter for regulating the transmission of data packets from a respective communication link onto the network, each said adapter having an access control function device for accessing the network connection information, said access control function device including a plurality of traffic source access control units, each said traffic source access control unit connected to a respective data traffic source in said respective communication link, each said traffic source access control unit having a data packet transmission regulator responsive to an updated bandwidth allocation, for adaptively regulating the transmission of lower-priority data packets from said respective data traffic source onto the network, and a utilization device connected to said data packet transmission regulator for specifying a utilization parameter by monitoring the connection utilization for the lower-priority data packets received from said respective data traffic source; and a connection agent device connected to said access control function device, said connection agent device including means for obtaining network connection information from the topology database, means for providing said network connection information to said access control function device, and computing means for deriving said updated bandwidth allocation for transmission of the lower-priority data packets in said respective communication link, said updated bandwidth allocation being a function of said connection utilization parameters obtained by said access control function device.

15. The adaptive bandwidth allocation device of claim 14 wherein said data packet transmission regulator comprises:

an admission buffer for storing the data packets received from said respective data traffic source;

a token generator for generating tokens at a rate determined by said updated bandwidth allocation;

a token pool for storing said generated tokens; and a leaky bucket connected to said admission buffer for outputting each said stored data packet along with a said token obtained from said token pool.

16. The adaptive bandwidth allocation device of claim 15 wherein said data packet transmission regulator further comprises:

a second token generator for generating second tokens at a rate determined by the bandwidth allocated to the transmission of the higher-priority data packets; and a second token pool, attached to said leaky bucket, for storing said generated second tokens.

17. The adaptive bandwidth allocation device of claim 15 wherein said token pool includes a low threshold reference value and a high threshold reference value, and wherein the value of said utilization parameter is changed if the level of said token pool level decreases below said low threshold reference value or if the level of said token pool increases above said high threshold reference value.

18. The adaptive bandwidth allocation device of claim 14 wherein said means for computing said updated bandwidth allocation comprises:

means for deducing the number $N^{(i)}$ of connections requiring an increase in bandwidth allocation;

means for deducing the number $N^{(e)}$ of connections not requiring a change in bandwidth allocation; and means for deducing the number $N^{(d)}$ of connections which can accommodate a decrease in bandwidth allocation.

19. The adaptive bandwidth allocation device of claim 15 further comprising means for receiving topology database updating (TDU) messages from the network, and updating the topology database in response to the receipt of said TDU messages.

20. An adaptive bandwidth allocation method for optimizing data traffic in a switching network having a plurality of switching nodes and a control system, the switching nodes interconnected by a plurality of communication links, each communication link for transporting data packets from a plurality of data traffic sources over a plurality of connections, the data packets including data packets of a higher priority and data packets of a lower priority, the control system including a topology database containing connection information about the network, said method comprising the steps of:

monitoring the bandwidth utilization of the data packet transmittals sent by the plurality of data traffic sources and transported on a selected communication link;

computing the number of connections requiring an increase in bandwidth allocation, the number of connections not requiring a change in bandwidth allocation, and the number of connections which can accommodate a decrease in bandwidth allocation;

deriving an updated bandwidth allocation in response to said step of computing; and adaptively regulating the transmission of the lower-priority data packets sent over a selected connection into the network in response to said step of computing.

21. The method of claim 20 wherein said step of monitoring the bandwidth utilization is performed in conjunction with a leaky bucket mechanism.

22. An adaptive bandwidth allocation device suitable for use in a switching network having a plurality of switching nodes and a control system, the switching nodes interconnected by a plurality of communication links, each communication link for transporting data packets from a plurality of data traffic sources over a plurality of connections, the data packets including data packets of a higher priority and data packets of a lower priority, the control system including a topology database containing connection information about the network, said adaptive bandwidth allocation device comprising:

a utilization device for monitoring the bandwidth used by data packet transmittals sent by the plurality of data traffic sources and transported on a selected communication link;

a connection agent for computing the number of connections requiring an increase in bandwidth allocation, the number of connections not requiring a change in bandwidth allocation, and the number of connections which can accommodate a decrease in bandwidth allocation, said connection agent further for deriving an updated bandwidth allocation; and an access control function device for adaptively regulating the transmission of the lower-priority data packets sent over a selected connection into the network in response to said updated bandwidth allocation.

23. The adaptive bandwidth allocation device of claim 22 wherein said utilization device is resident in one of the network switching nodes.

* * * * *